United States Patent
Mauro, II et al.

(10) Patent No.: US 7,039,246 B2
(45) Date of Patent: May 2, 2006

(54) VIDEO ENCODING TECHNIQUES

(75) Inventors: Anthony Patrick Mauro, II, San Diego, CA (US); Chienchung Chang, Rancho Santa Fe, CA (US); King-Chung Lai, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 605 days.

(21) Appl. No.: 10/139,772

(22) Filed: May 3, 2002

(65) Prior Publication Data

US 2003/0206658 A1    Nov. 6, 2003

(51) Int. Cl.
*G06K 9/36* (2006.01)

(52) U.S. Cl. ..................................... 382/236

(58) Field of Classification Search ............... 382/232, 382/236, 238, 239, 240, 248, 250; 348/400.1–402.1, 348/409.1, 410.1, 413.1, 416.1, 417.1; 375/240.12, 375/240.26
See application file for complete search history.

(56) References Cited

U.S. PATENT DOCUMENTS

| | | | | |
|---|---|---|---|---|
| 6,031,582 | A | | 2/2000 | Nishikawa et al. .......... 348/699 |
| 6,043,846 | A | * | 3/2000 | Shen et al. ............. 348/409.1 |
| 6,081,554 | A | * | 6/2000 | Lee et al. .................... 375/240 |
| 6,125,149 | A | * | 9/2000 | Jafarkhani et al. .......... 375/262 |
| 6,233,226 | B1 | * | 5/2001 | Gringeri et al. ............. 370/252 |
| 6,393,154 | B1 | * | 5/2002 | Lafe ........................... 382/239 |

FOREIGN PATENT DOCUMENTS

WO    0172045    9/2001

OTHER PUBLICATIONS

Jung, S-M et al: "Efficient Multilevel Successive Elimination Algorithms For Block Matching Motion Estimation" IEEE Proceedings: Vision, Image and Signal Processing, Apr. 22, 2002, pp. 73-84.

Lengwehasatit, K et al: "Probabilistic Partial—Distance Fast Matching Algorithms for Motion Estimation", IEEE Transactions on Circuits and Systems for Video Technology, New York, US, Feb. 2001, pp. 139-152.

Lengwehasatit, K et al: "Computationally Scalable Partial Distance Based Fast Search Motion Estimation",, Proceedings Of 7th IEEE International Conference On Image Processing, Sep. 10-13, 2000, pp. 824-827.

* cited by examiner

*Primary Examiner*—Jose L. Couso
(74) *Attorney, Agent, or Firm*—Philip R. Wadsworth; Charles D. Brown; George C. Pappas

(57) ABSTRACT

This disclosure is directed to encoding techniques that can be used to improve encoding of digital video data. The techniques can be implemented by an encoder of a digital video device in order to reduce the number of computations and possibly reduce power consumption during video encoding. More specifically, video encoding techniques are describe which utilize one or more programmable thresholds in order to terminate the execution of various computations when the computations would be unlikely to improve the encoding. By terminating computations prematurely, the amount of processing required for video encoding can be reduced, and power can be conserved.

9 Claims, 11 Drawing Sheets

VIDEO ENCODING TECHNIQUES

TECHNICAL FIELD

The invention relates to digital video processing and, more particularly, encoding of digital video data.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, and the like. These and other digital video devices can provide significant improvements over conventional analog video systems in creating, modifying, transmitting, storing, recording and playing full motion video sequences.

A number of different video encoding standards have been established for communicating digital video sequences. The Moving Picture Experts Group (MPEG), for example, has developed a number of standards including MPEG-1, MPEG-2 and MPEG-4. Other standards include ITU H.263, QuickTime™ technology developed by Apple Computer of Cupertino Calif., Video for Windows™ developed by Microsoft Corporation of Redmond, Wash., Indeo™ developed by Intel Corporation, RealVideo™ from RealNetworks, Inc. of Seattle, Wash., and Cinepak™ developed by SuperMac, Inc. These and other standards, including standards yet to be developed, will continue to evolve.

Video encoding standards achieve increased transmission rates by encoding data in a compressed fashion. Compression can reduce the overall amount of data that needs to be transmitted for effective transmission of image frames. The MPEG standards, for example, utilize graphics and video compression techniques designed to facilitate video and image transmission over a narrower bandwidth than could be achieved without the compression. In particular, the MPEG standards incorporate video encoding techniques that utilize similarities between successive image frames, referred to as temporal or interframe correlation, to provide interframe compression. The interframe compression techniques exploit data redundancy across frames by converting pixel-based representations of image frames to motion representations. In addition, the video encoding techniques may utilize similarities within image frames, referred to as spatial or intraframe correlation, in order to achieve intra-frame compression in which the motion representations within an image frame can be further compressed. The intraframe compression is typically based upon conventional processes for compressing still images, such as discrete cosine transform (DCT) encoding.

To support the compression techniques, many digital video devices include an encoder for compressing digital video sequences, and a decoder for decompressing the digital video sequences. In many cases, the encoder and decoder comprise an integrated encoder/decoder (CODEC) that operates on blocks of pixels within frames that define the sequence of video images. In the MPEG-4 standard, for example, the encoder of a sending device typically divides a video image frame to be transmitted into macroblocks comprising smaller image blocks. For each macroblock in the image frame, the encoder searches macroblocks of the immediately preceding video frame to identify the most similar macroblock, and encodes the difference between the macroblocks for transmission, along with a motion vector that indicates which macroblock from the previous frame was used for encoding. The decoder of a receiving device receives the motion vector and encoded differences, and performs motion compensation to generate video sequences.

The video encoding process is computationally intensive. In particular, the process of comparing video blocks to previously transmitted video blocks requires large numbers of computations. Improved encoding techniques are highly desirable, particularly for use in wireless devices or other portable video devices where computational resources are more limited and power consumption is a concern.

SUMMARY

Video encoding techniques are described which can improve video encoding by terminating computations when it is determined that additional computations are unnecessary for effective video encoding. For example, a video encoding technique may involve defining a threshold for a video encoding routine, and terminating at least part of the video encoding routine when a calculated difference value overcomes the threshold.

As described in greater detail below, thresholds may be defined at a task level, an iteration level, or both. For example, a task threshold may establish a threshold difference value. In that case, terminating at least part of the video encoding routine may include terminating a task of estimating a difference between a current video block associated with a current video frame and a different video block associated with a different video frame when a difference value associated with the task becomes greater than the threshold. The different video block associated with a different video frame may be a previous video block of a previous video frame, or a subsequent video block of a subsequent video frame of a sequence of frames.

In addition, an iteration threshold may define an acceptable value for a given iteration during video encoding. In that case, terminating at least part of the video encoding routine may include terminating tasks, i.e., terminating comparisons of a current video block associated with a current video frame with different video blocks associated with a different video frame, upon identifying a different video block that defines a difference value less than the threshold.

The techniques may be implemented in hardware, software, firmware, or any combination thereof. The techniques may be particularly advantageous in wireless digital video devices or other portable video devices where computational resources are more limited and power consumption is a concern. If implemented in software, the techniques may be directed to a computer readable medium comprising program code, that when executed, performs one or more of the encoding techniques described herein. Additional details of various embodiments are set forth in the accompanying drawings and the description below. Other features, objects and advantages will become apparent from the description and drawings, and from the claims.

DETAILED DESCRIPTION

Figure 1:
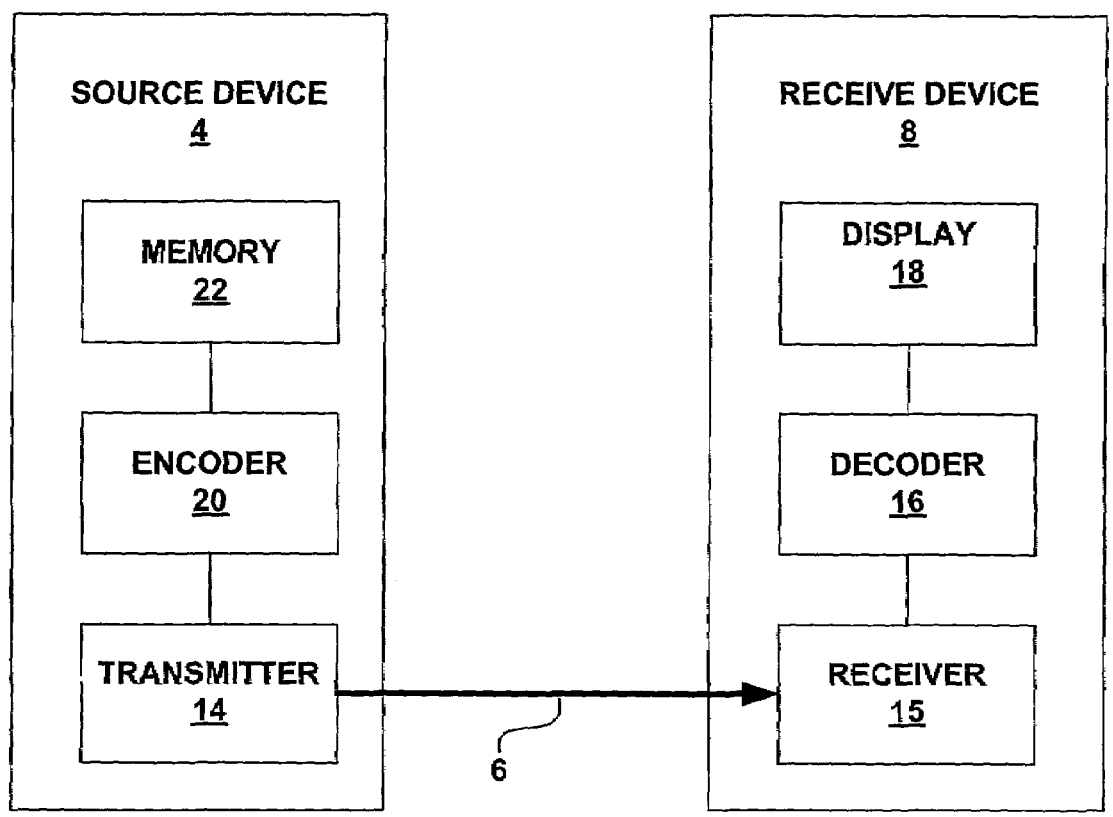
FIG. 1 is a block diagram illustrating an example system in which a source device transmits an encoded sequence of video data to a receive device.

In general, this disclosure is directed to encoding techniques that can be used to improve encoding of digital video data. The techniques can be executed by an encoder of a digital video device in order to reduce the number of computations and possibly reduce power consumption during video encoding. In this manner, the techniques can improve video encoding according to standards such as MPEG-4, and can better facilitate the implementation of video encoding within wireless devices where computational resources are more limited and power consumption is a concern. In addition, the techniques may not affect interoperability of public standards or other standards that implement motion estimation.

More specifically, video encoding techniques are described which utilize one or more programmable thresholds in order to terminate the execution of various computations when the computations would be unlikely to improve the encoding. By terminating computations prematurely, the amount of processing required for video encoding can be reduced, and power can be conserved. The programmable thresholds may be selected to achieve a desired level encoding quality. In the some cases, the thresholds may cause termination of computations only when it is known that additional computations would be unproductive. In other cases, the thresholds may also cause termination when encoding is deemed acceptable, even if additional computations might identify a more optimal video block match between a current video block and video blocks in a search space. In the latter case, the benefit of reduced computations may outweigh the benefits of identifying a more optimal video block match during encoding, i.e., in terms of increased processing speed, reduced power consumption or both.

A variety of embodiments are outlined in greater detail below. The different embodiments can be characterized as either task termination techniques or iteration termination techniques. In this disclosure, the term "task" refers to a common set of computations used to compare a current video block to a different video block within a search space. In other words, a task refers to a single comparison between a current video block and a different video block in the search space. For example, a task may involve performing a number of computations in order to compare a number of pixels of the current video block to those of the different video block. For example, 64 computations (in the case of an image block) or 256 computations (in the case of a macroblock) may comprise a task. During each task, the computations are accumulated to define an ongoing difference value for the task (sometimes referred to as a difference metric). The decision whether to terminate any given task can be made after each computation, or alternatively, after subsets of computations, i.e., integer numbers of computations that define a subset of the task. In the later case, the integer may be programmable to provide additional flexibility to the encoding routine.

As outlined in greater detail below, techniques can be used to identify when additional computations for a given task are unnecessary. For example, when a subset of computations of a second task collectively yield a difference value larger than that associated with a previously calculated first task, it is known that the additional computations for the second task are unnecessary because completion of the second task will not result in a lower difference value than the first task. In that case, the second task can be terminated without sacrificing encoding performance, and execution of a third task can begin more quickly.

Other embodiments are characterized below as "iteration termination techniques." In this disclosure, the term "iteration" refers to a common set of tasks performed during video encoding. A complete series of tasks associated with a current video block is an iteration. In other words, an iteration is a set of comparisons in which a current video block is compared to a set of previous video blocks (or subsequent video blocks) in the search space. Each individual comparison is a task that involves a number of computations. Thus, a search space defines a set of video blocks that are compared to a current video block during an iteration. Each comparison of an iteration is referred to as a task, and each task, i.e., each comparison, may involve a number of computations. In some cases, an iteration may include defining a first search on a search space, identifying a first match in the search space, defining a second search on a subset of the search space based on the first match, and identifying a second match in the subset. In that case, termination may occur during the process of identifying the first match, the second match, or both.

Termination techniques may be executed at the task level as mentioned above, or may be executed at the iteration level, or both at the task level and iteration level. In one example, an iteration threshold defines a value that is acceptable, i.e., adequate for effective video encoding. In that case, if an iteration is performed which identifies a different video block that matches the current video block in a manner that is deemed acceptable by the iteration threshold, the iteration can be terminated, and the next video block to be encoded can be compared to the search space. In that case, the execution of a number of unnecessary tasks can be avoided.

The techniques outlined below are described in the context of comparing a video block to be encoded to previous video blocks of a previous video frame. It is understood, however, that the same techniques may be used when comparing the video block to be encoded to video blocks of a subsequent video frame. In some cases, bi-directional motion estimation is used, wherein the video block to be encoded is compared to various video blocks of one or more previous video frames and various video blocks of subsequent video frames. In short, the techniques may be used whenever a video block to be encoded is being compared to a different video block, such as a video block of a previous video frame or a video block of a subsequent video frame.

The techniques may be capable of providing a number of advantages. For example, the techniques can reduce the number of computations required for video encoding and may speed the encoding process. Furthermore, a reduced number of computations may result in reduced power consumption which is particularly advantageous for battery powered devices. The techniques may be useful with any of a wide variety of digital video encoding standards that implement motion estimation. Many details, however, are outlined herein in the context of the MPEG-4 standard.

FIG. 1 is a block diagram illustrating an example system 2 in which a source device 4 transmits an encoded sequence of video data over communication link 6 to a receive device 8. Source device 4 and receive device 8 are both digital video devices. In particular, source device 4 encodes and transmits video data using any one of a variety of video compression standards such as MPEG-4 developed by the Moving Picture Experts Group. Other standards may include MPEG-1, MPEG-2 or other MPEG standards developed by the Moving Picture Experts Group, QuickTime™ technology developed by Apple Computer of Cupertino Calif., Video for Windows™ developed by Microsoft Corporation of Redmond, Wash., Indeo™ developed by Intel Corporation, and Cinepak™ developed by SuperMac Inc.

Communication link 6 may comprise a wireless link, a physical transmission line, a packet based network such as a local area network, wide-area network, or global network such as the Internet, a public switched telephone network (PSTN), or combinations of various links and networks. In other words, communication link 6 represents any suitable communication medium, or possibly a collection of different networks and links, for transmitting video data from source device 4 to receive device 8.

Source device 4 may be any digital video device capable of encoding and transmitting video data. For example, source device 4 may include memory 22 for storing digital video sequences, video encoder 20 for encoding the sequences, and transmitter 14 for transmitting the encoded sequences over communication link 6. In some cases, source device 4 may also include an image sensor (not shown in FIG. 1) such as a camera for capturing video sequences and storing the captured sequences in memory 22. Receive device 8 may be any digital video device capable of receiving and decoding video data. For example, receive device 8 may include a receiver 15 for receiving encoded digital video sequences, decoder 16 for decoding the sequences, and display 18 for displaying the sequences to a user.

Example devices for source device 4 and receive device 8 include servers located on a computer network, workstations or other desktop computing devices, and mobile computing devices such as a laptop computers. Other examples include digital television broadcasting satellites and receiving devices such as digital televisions, digital cameras, digital video cameras or other digital recording devices, digital video telephones such as cellular radiotelephones and satellite radio telephones having video capabilities, other wireless video devices, and the like.

In some cases, source device 4 and receive device 8 each include an encoder/decoder (CODEC) (not shown) for encoding and decoding digital video data. In that case, both source device and receive device may include transmitters and receivers as well as memory and displays. Many of the encoding techniques outlined below are described in the context of a digital video device that includes an encoder. It is understood, however, that the encoder may form part of a CODEC.

Source device 4, for example, operates on blocks of pixels within the sequence of video images in order to encode the video data. For example, the encoder 20 of source device 4 may divide a video image frame to be transmitted into macroblocks comprising a number of smaller image blocks. For each macroblock in the image frame, encoder 20 of source device 4 searches macroblocks stored in memory 22 for the preceding video frame already transmitted (or a subsequent video frame) to identify a similar macroblock, and encodes the difference between the macroblocks, along with a motion vector that identifies the macroblock from the previous frame that was used for encoding. Source device 4 may support programmable thresholds which can cause termination of various tasks or iterations during the encoding process in order to reduce the number of computations and conserve power, as described herein.

The receiver 15 of receive device 8 receives the motion vector and the encoded video data, and decoder 16 performs motion compensation techniques to generate video sequences for display to a user via display 18. The decoder 16 of receive device 8 may also be implemented as an encoder/decoder (CODEC). In that case, both source device and receive device may be capable of encoding, transmitting, receiving and decoding digital video sequences.

Figure 2:
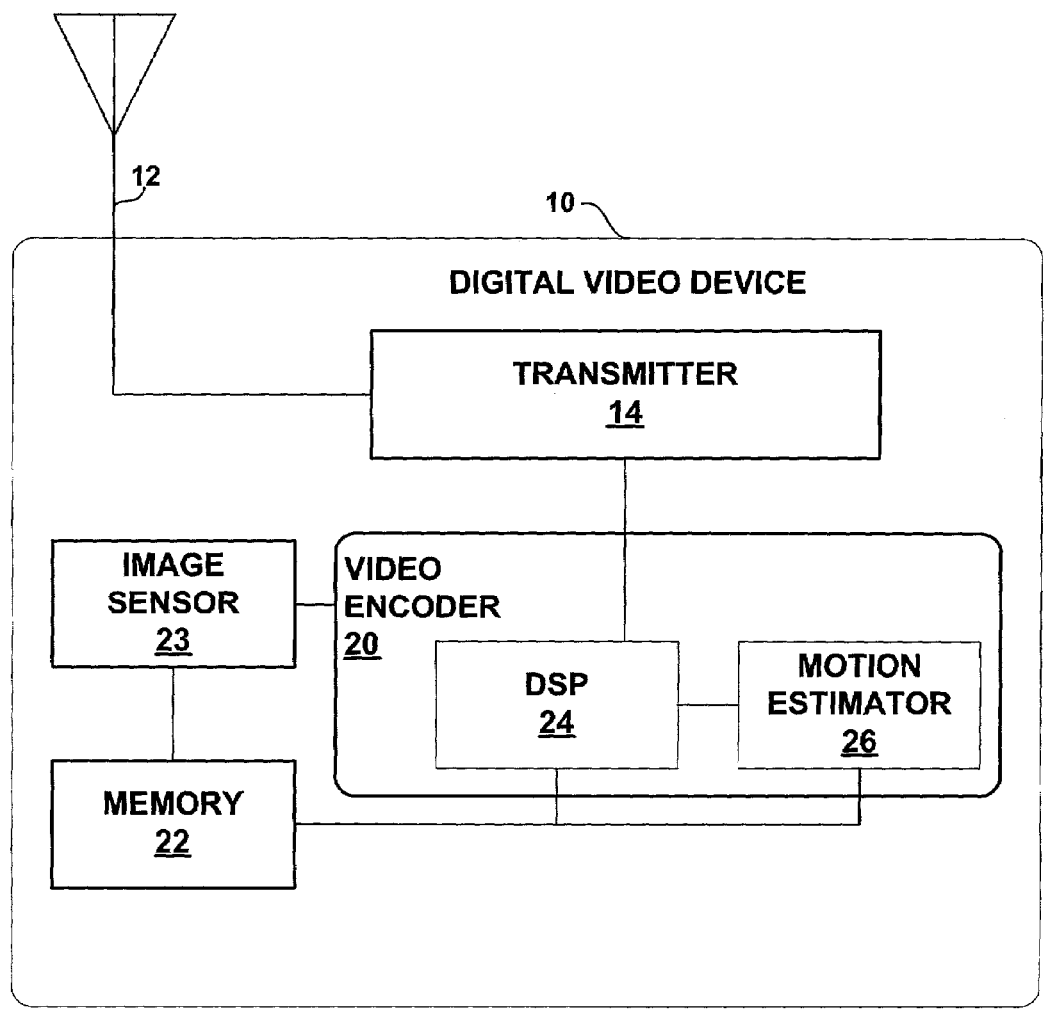
FIG. 2 is a block diagram illustrating an example digital video device incorporating a video encoder that compresses digital video sequences.

FIG. 2 is a block diagram illustrating an example digital video device 10, such as source device 4 incorporating a video encoder 20 that compresses digital video sequences according to the techniques described herein. Exemplary digital video device 10 is illustrated as a wireless device, such as a mobile computing device, a personal digital assistant (PDA), a wireless communication device, a radio telephone, and the like. However, the techniques in this disclosure is not limited to wireless devices, and may be readily applied to other digital video devices including non-wireless devices.

In the example of FIG. 2, digital video device 10 transmits compressed digital video sequences via transmitter 14 and antenna 12. Video encoder 20 encodes the video sequences and buffers the encoded digital video sequences within video memory 22 prior to transmission. Memory 22 may also store computer readable instructions and data for use by video encoder 20 during the encoding process. Memory 22 may comprise synchronous dynamic random access memory (SDRAM), FLASH memory, electrically erasable programmable read only memory (EEPROM), or the like. In some cases, digital video device 10 includes an image sensor 23 for capturing video sequences. For example, image sensor 23 may capture video sequences and store them in memory 22 for encoding. Image sensor 23 may also be coupled directly to video encoder 20 in order to improve "real time" video encoding.

As described in detail below, encoder 20 implements a digital signal processor (DSP) 24 that can receive programmable thresholds which define or limit the encoding algorithms performed by video encoder 20. DSP 24 and motion estimator 26 may execute the encoding algorithms, and may terminate various tasks or iterations based on the programmable thresholds. As a result, video encoding can be simplified, eliminating unnecessary computations, and possibly reducing computations when encoding is deemed acceptable.

Figure 3:
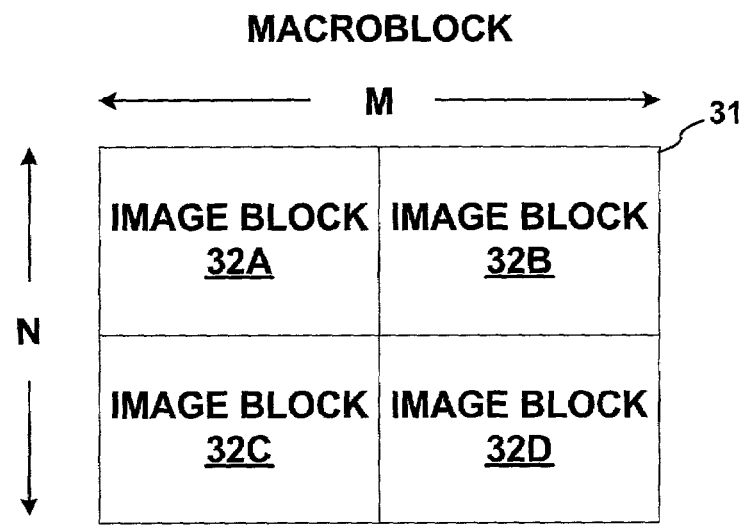
FIG. 3 is a conceptual illustration of an example macroblock of video data.

FIG. 3 illustrates an example macroblock 31 that can be stored within memory 22. MPEG standards and other video encoding schemes make use of macroblocks during video encoding. Accordingly, the encoding techniques described herein that improve video encoding may likewise operate on macroblocks. In MPEG standards, the term macroblock refers to a 16 by 16 collection of pixel values that form a subset of a video image frame. Each pixel value may be represented by a byte of data, although larger or smaller number of bits could also be used to define each pixel in order to achieve the desired imaging quality. A macroblock may comprise a number of smaller 8 by 8 pixel image blocks 32. In general, the encoding techniques described herein may operate using blocks of any defined size, such as 16-byte by 16-byte macroblocks, 8-byte by 8-byte image blocks, or different sized video blocks, if desired.

During encoding, a current video block associated with a current image frame to be encoded is compared with various video blocks of the previous image frame. Upon identifying a similar video block in the previous frame, the differences between the current video block and the similar video block in the previous frame can be transmitted along with a motion vector that identifies the similar video block in the previous frame. In this manner, the required bandwidth for transmission of streams of video data can be significantly reduced. The encoding techniques described herein can improve the encoding process by causing early termination of various tasks or iterations in order to reduce the number of computations and reduce power consumption during encoding.

Upon receiving encoded video blocks, receive device 8 (FIG. 1) performs motion compensation techniques to generate video sequences for display to a user via display 18. For example, receive device 8 may store previously received blocks of a previously received image frame in memory (not shown). Decoder 16 of receive device 8 can decode video blocks by accessing the previously received video blocks identified by the transmitted motion vector, and modifying the identified video blocks in accordance with the differences transmitted with the motion vector. In this manner, video sequences can be transmitted over a smaller bandwidth than could be achieved without the encoding.

Figure 4:
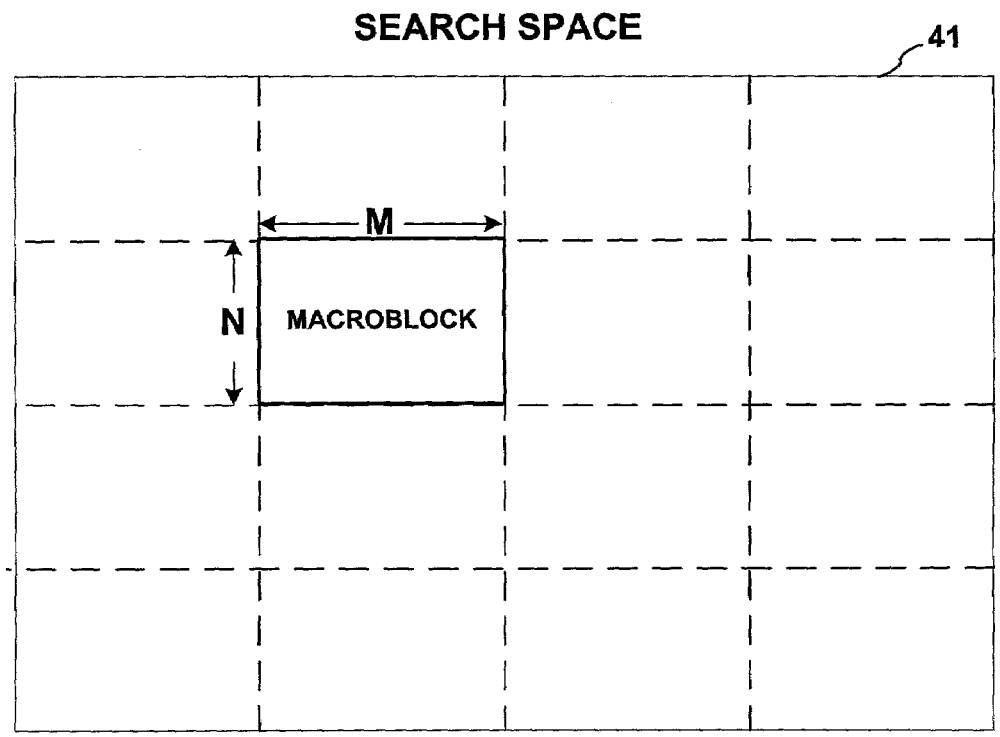
FIG. 4 is a conceptual illustration of an example search space.

FIG. 4 illustrates an example search space 41 that can be stored within memory. The search space 41 is a buffered collection of video blocks corresponding to a previously transmitted image frame (or a subsequent image frame of a sequence of frames). The search space may comprise the previous image frame in its entirety, or a subset of the previous image frame, if desired. In general, a larger search space will result in more computations during video encoding because a larger search space defines more blocks that can be compared to the current block to be encoded, i.e., more tasks per iteration. Again, the current image frame is compared to blocks in the search space 41 in order to identify an adequate match so that the differences between the current block and the similar image block in the previous frame can be transmitted along with a motion vector that identifies the similar image block of the previous frame.

Figure 5:
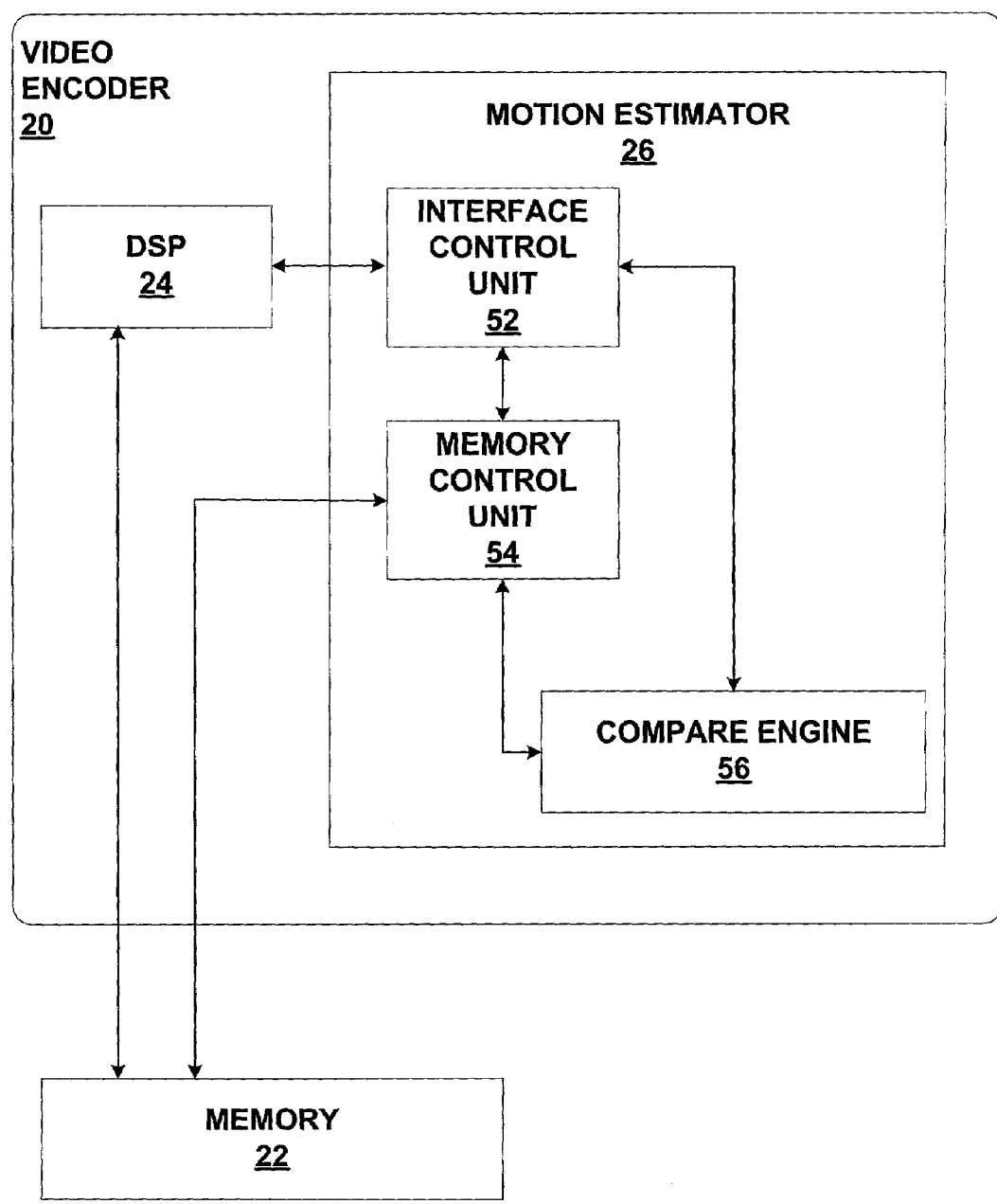
FIG. 5 is a block diagram illustrating an example video encoder in further detail.

FIG. 5 is a block diagram illustrating exemplary components of a video encoder 20 in greater detail. As shown, exemplary video encoder 20 includes a digital signal processor (DSP) 24 coupled to a motion estimator 26. For example, motion estimator 26 may comprise hardware components designed to accelerate the video encoding process. The separate motion estimator 26 may not be necessary for all embodiments, as the hardware functionality may be programmed into the digital signal processor 24. Nevertheless, a dedicated motion estimator 26 that includes a compare engine 56 can significantly accelerate the execution of computations performed during video encoding. DSP 24 and motion estimator 26 may be coupled to memory 22 which stores the various blocks to be encoded as well as the search space to which the blocks are compared during the encoding process. Memory 22 may also buffer encoded video data prior to transmission via transmitter 14 (FIG. 2).

DSP 24 may execute various video encoding algorithms, such as video compression algorithms that operate according to the MPEG-4 standard. DSP 24 may access motion estimator 26 in order to accelerate the video encoding process. Motion estimator 26 may include an interface control unit 52 that receives hardware executable commands from DSP 24 and reports comparison results to DSP 24 upon executing the commands. Motion estimator 26 may also include a memory control unit 54 in order to access and possibly partition the video data stored in memory 22 so that comparisons between a current image block and a search space can be made.

DSP 24 stores one or more thresholds that define various scenarios where termination of tasks, or termination of iterations during the video encoding process can occur. The thresholds may be programmable thresholds that define when computations of a particular task can be terminated prior to fully executing the task. Also, the thresholds may be programmable thresholds that define when an iteration has identified a previous video block that is acceptable for effective video encoding. In that case, additional tasks for the iteration can be terminated and the current video block can be encoded using the previous video block that is deemed acceptable.

Interface control unit 52 may receive commands issued by DSP 24 that cause execution of various aspects of the video encoding algorithm in the hardware of motion estimator 26. In particular, motion estimator 26 may implement a compare engine 56 that compares current video blocks to be encoded, with previous video blocks associated with a previous video frame already transmitted. The previous video blocks may be video blocks within a search space defined by memory control unit 54. Again, the techniques may also be used when subsequent image frames form the search space. In any case, upon receiving commands from DSP 24, interface control unit 52 and memory control unit 54 may queue the data to be compared in compare engine 56. Compare engine 56 can then compare current video blocks to be encoded, with previous video blocks using comparison techniques, such as Sum of Absolute Difference (SAD) techniques or Sum of Squared Difference (SSD) techniques, as is well known in the art of video encoding. Other comparison techniques may also be used.

The SAD technique involves the task of performing absolute difference computations between pixel values of the current block to be encoded, with pixel values of the previous block to which the current block is being compared. The results of these absolute difference computations are summed, i.e., accumulated, in order to define a difference value indicative of the difference between the current video block and the previous video block to which the current video block is being compared. For an 8 by 8 pixel image block, 64 differences may be computed and summed, and for a 16 by 16 pixel macroblock, 256 differences may be computed and summed. As outlined below, task thresholds may be defined and/or updated. Then, task computations may be terminated when an accumulated difference value exceeds the task threshold. In that case, the additional computations are unnecessary. Thus, the task can be terminated when the difference value for that task exceeds the task threshold, thereby avoiding unnecessary computations.

Compare engine 56, for example, may include one or more threshold registers to store and update the threshold values. The values stored in the threshold registers can be compared to ongoing summations performed by compare engine 56 in order to determine whether task computations or a whole iteration can be terminated prematurely. In this manner, computations can be avoided, video encoding speed can be increased, and power can be conserved.

The SSD technique also involves the task of performing difference computations between pixel values of the current block to be encoded with pixel values of the previous block to which the current block is being compared. In the SSD technique, the results of absolute difference computations are squared, and then the squared values are summed, i.e., accumulated, in order to define a difference value indicative of the difference between the current video block and the previous video block to which the current video block is being compared. Task thresholds may also be defined and/or updated when the SSD technique is used. Then, task computations may be terminated when an accumulated difference value exceeds the task threshold.

The task thresholds may be initialized and then updated within threshold registers of compare engine 56 as the tasks are performed. For example, DSP 24 may load the threshold registers with programmed values that can be updated over the course of an iteration. If a task is performed which computes a difference value less than the threshold, the threshold may be updated with that difference value. If during the computation, the computed difference value ever exceeds the threshold, the task can be terminated, and the next task can begin. In some cases, the task threshold may be initialized with an original difference value that will cause termination of even the first task, if computations of the first task exceed the threshold. In other cases, the task threshold may be initialized by the difference value calculated for the first task. The latter case may be preferred for some scenarios because termination of a subsequent task would only occur if an earlier task was deemed to yield a lower difference value.

In addition to establishing task thresholds, DSP 24 may also be programmed with iteration thresholds. Again, in this disclosure, an iteration refers to a set of tasks, i.e., comparisons performed on any given current video block to be encoded. In other words, a task comprising a plurality of computations is used to compare a current video block to a previous video block, and a subsequent task of an iteration is used to compare the same current video block to a different previous video block within the search space. Upon performing all of the tasks of an iteration, the previous video block that is the best match to the current video block can be identified. In other words, the previous video block that yields the best match is the video block for which the task of comparing the current video block to be encoded yields the lowest difference value.

By programming iteration thresholds into DSP 24, an iteration can be terminated early, upon identifying a previous video block that yields a match deemed sufficient to encode the block with minimal quality degradation. The level of encoding quality can be selected by selecting the appropriate threshold. For example, if the task of comparing a current video block to a previous video block yields a difference value less than the iteration threshold, that previous video block can be declared acceptable for video encoding. Accordingly, the current video block may be encoded by buffering the differences between the current video block and the previous video block that was declared acceptable for video encoding. The current video block can then be sent by transmitting the differences along with a motion vector that identifies the previous video block.

By terminating an iteration, processing speed can be improved and the number of computations required may be significantly reduced. In particular, all of the computations associated with subsequent tasks of that iteration can be avoided. Such an encoding technique may sometimes yield sub-optimal encoding because a subsequent task of the iteration (if performed) may actually identify a better match than the video block declared acceptable. Still, the reduced number of computations may outweigh the fact that the encoding may be sub-optimal. If the encoding is acceptable, computational savings and associated power savings may outweigh the benefits that more optimal encoding can provide, such as improved video resolution. In some embodiments, the value of the iteration threshold may be selected to balance advantages associated with improved resolution and image quality with advantages associated with reduced computations and reduced power consumption.

Figure 6:
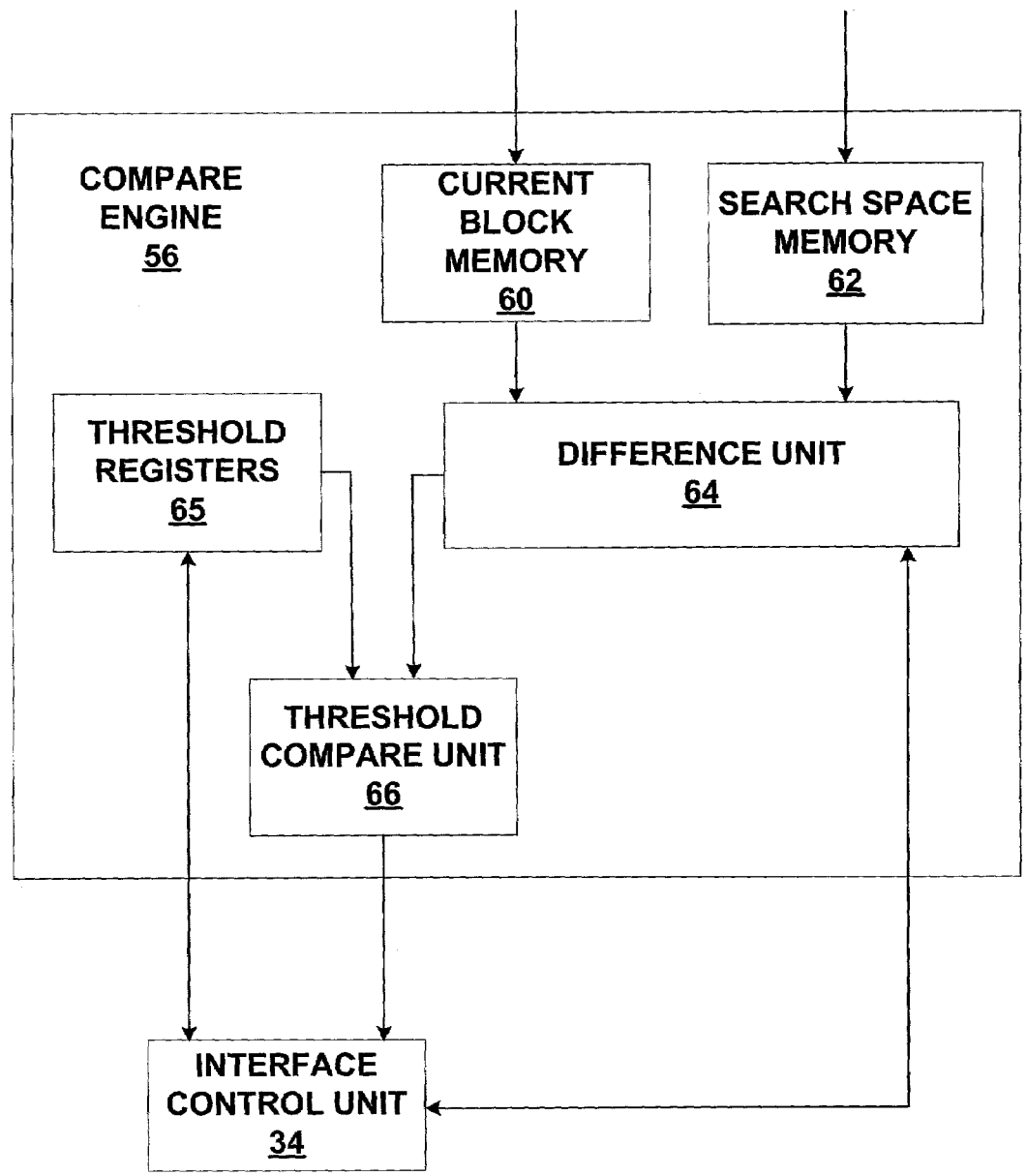
FIG. 6 is a block diagram illustrating an example compare engine of a video encoder in further detail.

FIG. 6 is a more detailed block diagram of compare engine 56 that can be implemented to accelerate the comparisons required for video encoding. Compare engine 56 includes two internal high-speed memories 60, 62 for caching the current block to be encoded and previous video blocks to which the current video block is compared. In particular, compare engine 56 includes current block memory 60 to store the current block to be encoded. In addition, compare engine 56 includes search space memory 62 to store all of the data from which to identify the closest video block already transmitted. In an embodiment supporting MPEG standards, for example, block memory 60 may store a macroblock to be transmitted, while search space memory 62 may store a plurality of previously transmitted macroblocks, such as a previously transmitted video frame. By way of example, a typical block may consist of a block of 8 by 8 pixels, a macroblock may consist of a block of 16 by 16 pixels, and a search space may consist of a block of 48 by 48 pixels, although this disclosure is not limited in these respects.

Difference unit 64 includes address generation logic for retrieving video data from memories 60, 62. During the encoding process, memory control unit 54 (FIG. 5) fetches the current block to be encoded from memory 22 and stores the current block within memory 60 of compare engine 56. In addition, memory control unit 54 fetches a search space within the previous video frame and stores the video data corresponding to the search space within search space memory 62. For example, DSP 24 may cause memory control unit 54 to transfer the specified video data to the respective internal memories 60, 62 of compare engine 56.

Difference unit 64 performs pixel-wise comparisons between the video data to calculate one or more difference values (sometimes referred to as differential metrics). By internally caching the current block to be encoded as well as the entire search space within memories 60 and 62, respectively, compare engine need not access memory 22 between searches. Consequently, video encoder 20 can achieve increased encoding speeds relative to conventional architectures.

To calculate the difference values, i.e., differential metrics, difference unit 64 may implement any one of a number of algorithms to produce an output indicative of the differences between the current block stored within memory 60 and various blocks within search space memory 62. As described above, differential unit 64 may calculate the Sum of the Absolute Differences (SAD) or the Sum of the Squared Differences (SSD) between the block to be encoded and blocks within the previous video frame. Alternatively, differential calculator 64 may perform a Mean Square Error (MSE), a Normalized Cross Correlation Function (NCCF), or another suitable comparison algorithm. Once difference unit 64 has calculated the difference values and the corresponding motion vector is identified for the block in the search space that yielded the lowest difference value, the pending results may be transferred to DSP 24.

In order to reduce the number of computations, increase encoding speed, and decrease power consumption, the encoding algorithm executed by DSP 24 and motion estimator 26 may support one or more thresholds that cause termination of tasks, termination of iterations, or termination of tasks and iterations during the encoding routine. As outlined above, the thresholds can be characterized as task thresholds or iteration thresholds. If desired, the thresholds may be loaded and updated in one or more threshold registers 65 of compare engine 56. A threshold compare unit 66 can be implemented to compare the thresholds stored in threshold registers 65 to ongoing difference values summed by difference unit 64. In this manner, comparisons to the thresholds, such as a task threshold or an iteration threshold, can be made very quickly in hardware as difference unit 64 calculates the sums according to SAD or SSD techniques. The different embodiments involving task thresholds and iteration thresholds are discussed below in turn.

Figure 7:
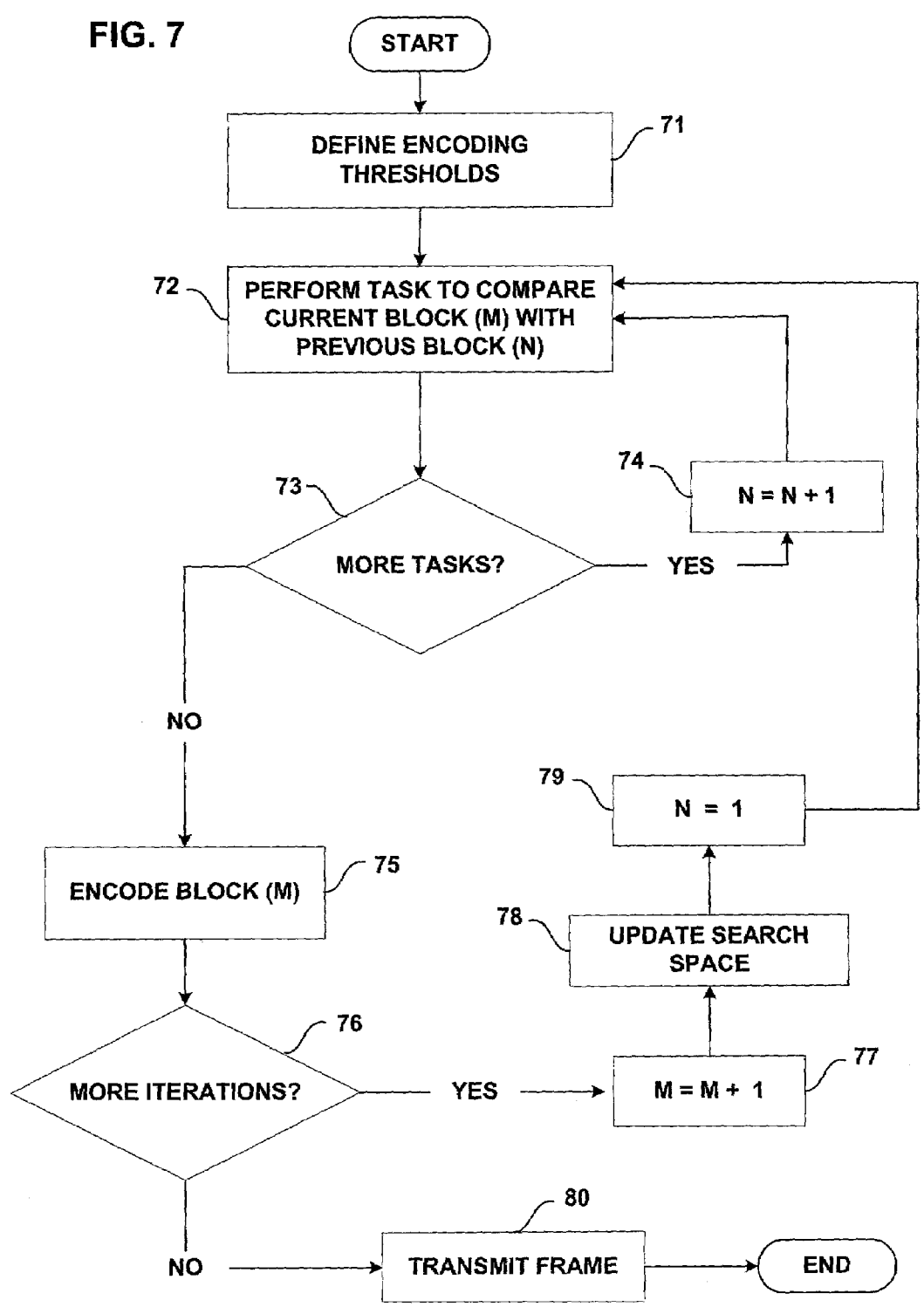
FIGS. 7–12 are flowcharts illustrating video encoding techniques.

FIG. 7 is a flow diagram illustrating a video encoding technique in which blocks of a video frame are encoded using differences between the blocks of a previously transmitted frame and motion vectors. As shown, DSP 24 defines one or more encoding thresholds (71). For example, DSP 24 can be programmed with one or more task thresholds or iteration thresholds. Additional details of the termination of a task in response to overcoming a task threshold, and the termination of an iteration in response to overcoming an iteration threshold are outlined below. The encoding thresholds define when the terminations can occur in order to improve the encoding process.

Video encoder 20 performs a task to compare the current block (M) to be encoded, with a previous block (N) (72) such as by invoking compare engine 56 within motion estimator 26. Each respective comparison is referred to herein as a task, and typically involves a plurality of difference computations in which pixel values of block (M) are subtracted from pixel values of a previous block (N) according to well known SSD or SAD techniques such as by implementing difference unit 64. The tasks are performed in an incremental fashion. That is, after performing each individual task, video encoder 20 determines whether there are more tasks to perform (73) and, if so, performs the additional tasks (72). The incremental process of performing a number of tasks for a given iteration is illustrated in the flow diagram by the loop, in which the value N is incremented (74) as each task is performed to consider the next one of the previous blocks. The number of tasks, i.e., the number of comparisons, is defined by the size of the search space. Thus, if the search space includes X previous blocks to be compared to current block (M), X number of tasks will be performed for that iteration, i.e., the iteration for given block will terminate when N=X. As outlined in greater detail below, the computations of any individual task may be terminated when a task threshold is overcome.

Once all of the tasks for a given iteration have been performed, i.e., every comparison between block (M) and the previous blocks in the search space have been performed (no branch of 73), block (M) can be encoded (75). In particular, the current block (M) can be encoded by identifying the previous block (N) for which a task generated a lowest difference value. Block (M) is encoded using the difference between block (M) and the block (N) yielding the lowest difference value, as well as a motion vector that identifies the block (N) used for the encoding.

Video encoder 20 then determines whether more iterations need to be performed (76), i.e., whether there are additional blocks in the present frame being encoded. If so, the additional blocks are compared to the search space in a manner similar to the techniques outlined above. The execution of a subsequent iteration is illustrated in the flow diagram as incrementing the value (M) to identify another block to be encoded (77), updating the search space (78) if desired, and resetting the value (N) (79). For each iteration, a number of tasks are performed as outlined above and the current block (M) for the given iteration is encoded using differences between the given current block (M) and the block (N) within the search space yielding the lowest difference value, as well as a motion vector that identifies the block (N) used for the encoding of the given block (M). As outlined in greater detail below, the computations of an iteration may be terminated when an iteration threshold is overcome. In that case, the execution of a number of tasks can be avoided.

Once all the iterations have been performed for a given video frame, i.e., once all the blocks of the video frame have been encoded (no branch of 76), video encoder 20 can forward the video data to transmitter 14, and transmitter 14 can transmit the encoded blocks of the video frame (80).

Figure 8:
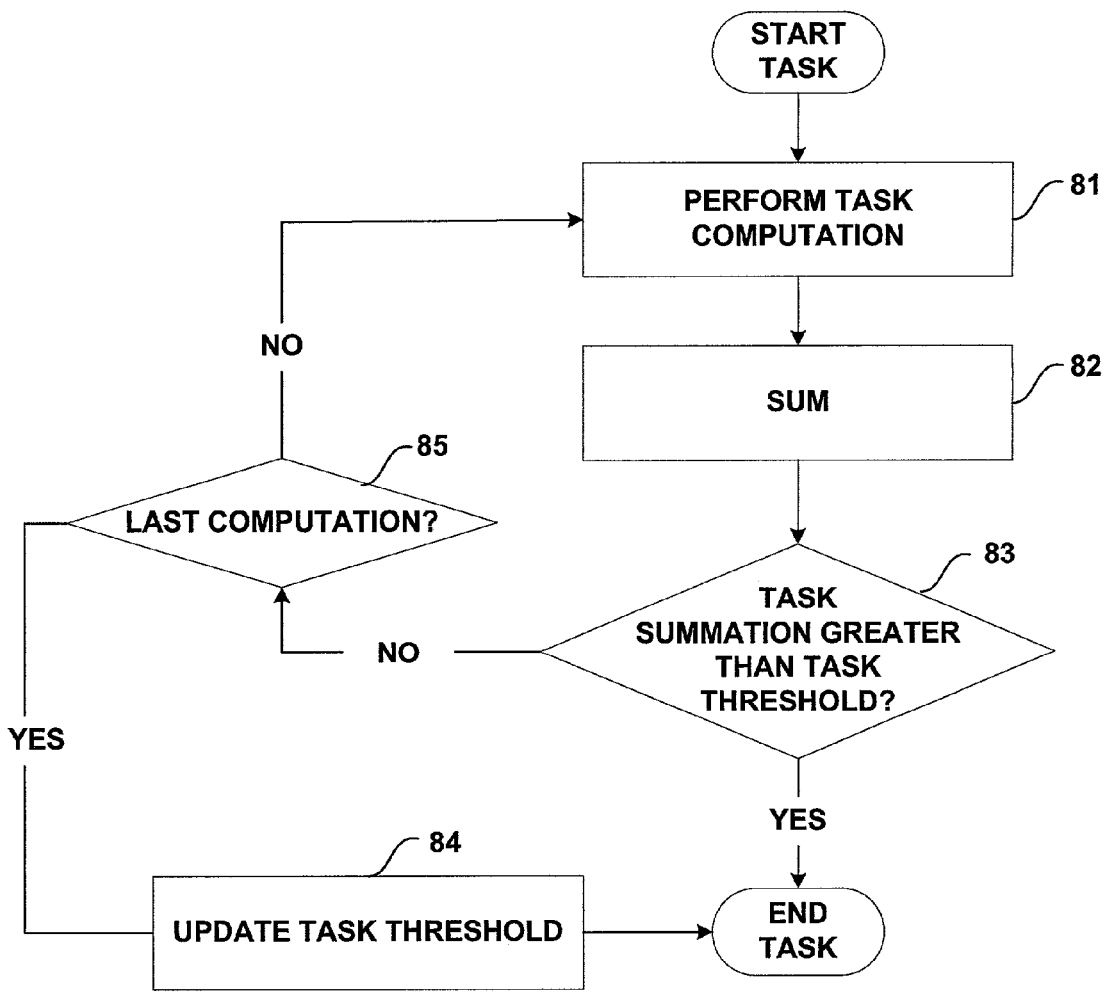

FIG. 8 is a more detailed flow diagram illustrating the execution of a task in which block (N) is compared to previous blocks within a search space. In other words, the technique illustrated in FIG. 8 may correspond to item 72 of FIG. 7. As shown, difference unit 64 performs a task computation (81) such as an absolute difference computation or a squared difference computation, and then sums the computation to produce an ongoing difference value defined by the task (82). In other words, the summation may comprise an ongoing estimate of the difference value (sometimes referred to as a difference metric) between block (N) and the video block within the search space that is being compared to block (N). If the summation becomes greater than a task threshold (yes branch of 83), the task is terminated.

For example, threshold compare unit 66 may periodically compare a task threshold stored in threshold register 65 to the ongoing summation of the difference value stored in difference unit 64. In accordance with the MPEG-4 standard, if macroblocks are compared by difference unit, threshold compare unit 66 may periodically perform task comparisons following summation of the difference values for smaller image blocks that collectively define the larger macroblock. If the summation, i.e., the ongoing difference value calculated by difference unit 64, becomes greater than a task threshold stored in threshold registers 65 (yes branch of 83), the task is terminated. Thus, the next task for that iteration can begin more quickly because computations for the terminated task are avoided. In this manner, termination can reduce the number of computations and thereby save time and power during the encoding process.

As long as the summation is not greater than the task threshold (no branch of 83), additional computations are iteratively performed until no more computations are left for the task (yes branch of 84). The task threshold stored in threshold registers 65 can then be updated with the summation (85). As mentioned above, 64 computations (in the case of an image block) or 256 computations (in the case of a macroblock) may comprise a complete task. By identifying when a summation, i.e., a difference value, becomes greater than a task threshold, some of these computations can be avoided because the task can be terminated early (yes branch of 83). Moreover, by avoiding computations, the speed of the encoding process can be increased, and power may be conserved. By loading and updating the task threshold in a local threshold registers 65 of compare engine 56, the ongoing comparisons can be made very quickly.

The task threshold can be updated over the course of an iteration. In the example, of FIG. 8, the first task, i.e., the first set of computations will initialize the task threshold. Thereafter for that iteration, subsequent tasks will be compared to the task threshold, and if the difference value associated with a subsequent task becomes larger than the task threshold, the task can be terminated because it is known that the task will not identify a more optimal video block for encoding the current video block. The routine illustrated in FIG. 8 may result in particularly good encoding because the threshold causes termination of a task only when it is known that additional computations would be unproductive.

In some cases, the comparison of the summation to the task threshold does not occur after each computation. For example, to simplify the architecture, it may be desirable to sum the results of a number of computations before comparing the summation to the task threshold. Additionally, the number of computations that are performed prior to comparing the summation to the task threshold may be programmable. For example, if 256 computations comprise a complete task, comparisons of the ongoing difference value of the task may occur after subsets of 8 computations. In that case a programmable value defining the number of computations that are performed prior to comparing the summation would be set to 8.

Figure 9:
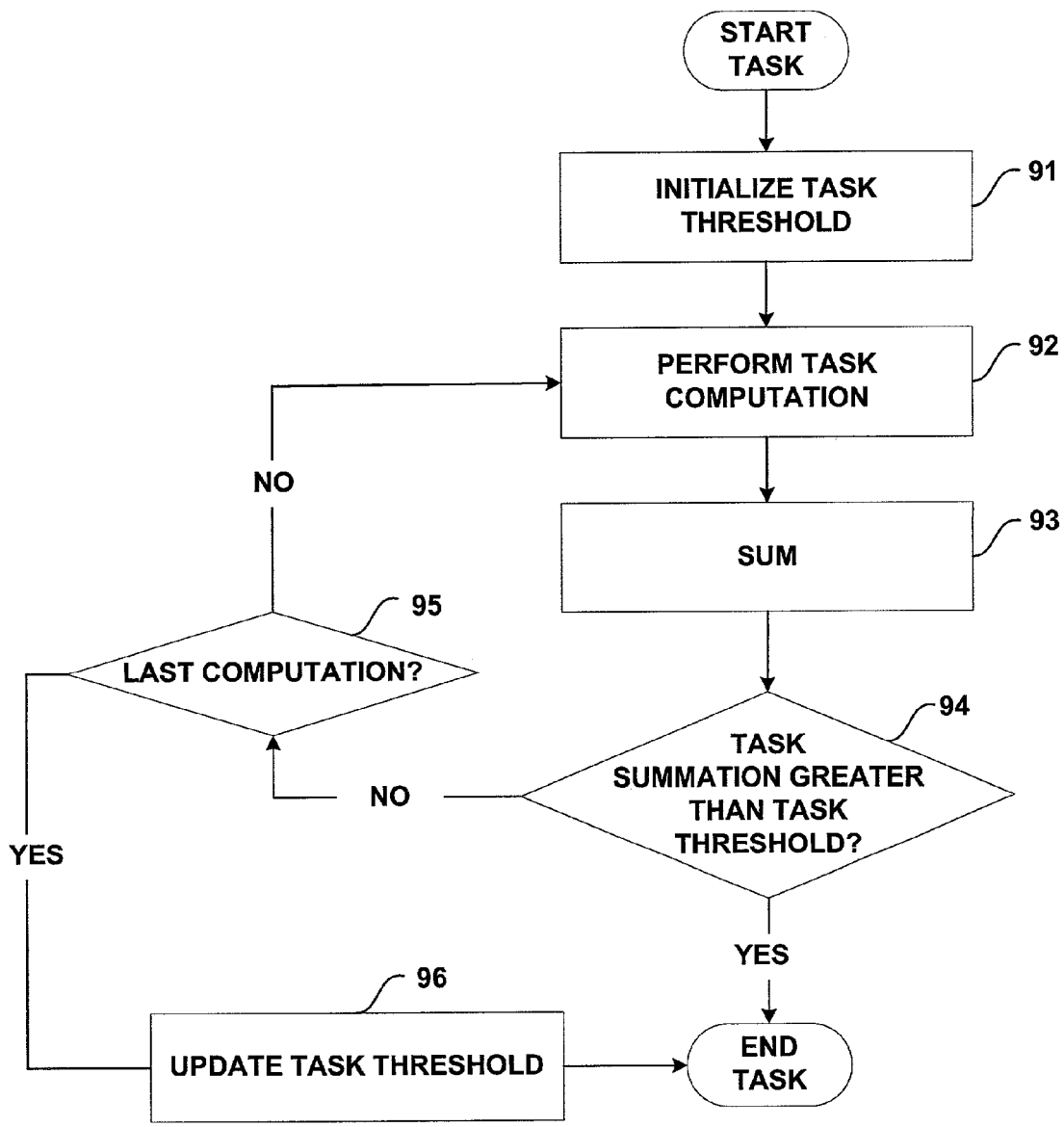

FIG. 9 illustrates a slight variation on the task routine illustrated in FIG. 8. In this case, an initial task threshold is established (91), such as by programming the initial task threshold into DSP 24. In that case, even a first task may be terminated if the difference value summation of the first task exceeds the initialized task threshold. Task computations are performed (92) such as an absolute difference calculation or a squared difference calculation, and the calculation is summed (93). Again, the summation may comprise an ongoing estimate of the difference value between block (N) and the video block within the search space that is being compared to block (N). If the summation ever becomes greater than a task threshold (yes branch of 94), the task is terminated. However, as long as the summation is not greater than the task threshold (no branch of 94), additional computations are iteratively performed until no more computations are left for the task (95). The task threshold can then be updated with the summation (96). All subsequent tasks for that particular iteration are compared to the updated threshold. Thus, after performing all of the tasks for the given iteration (FIG. 7), a video block that yields a best match, e.g., the lowest difference value, can be identified. Importantly, because termination of various tasks occurs whenever the difference value for a task becomes greater than that of a previous task (as defined by the periodically updated threshold), identification of the best match can occur with a reduced number of computations.

Figure 10:
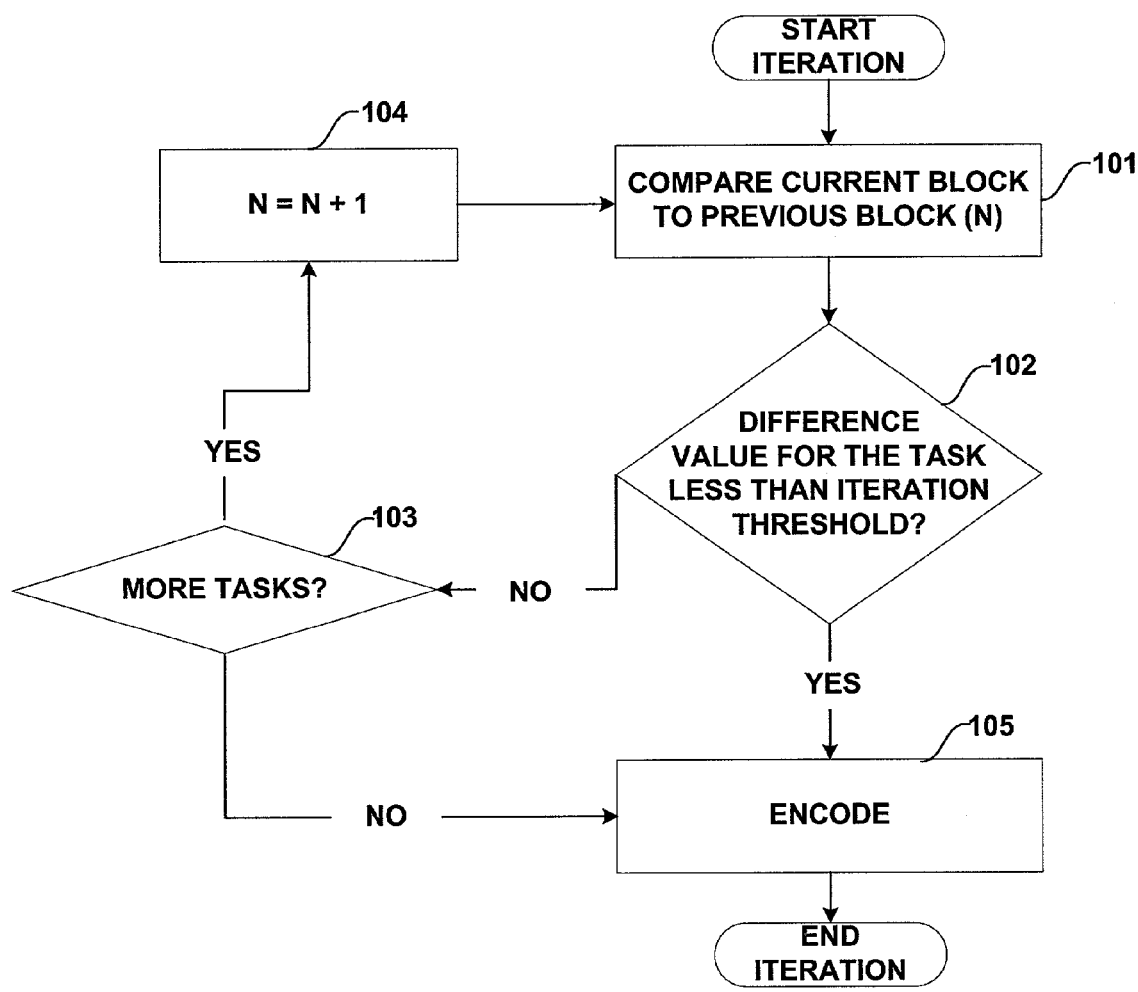

FIGS. 8 and 9 illustrate the termination of individual tasks by identifying scenarios where the additional computations for that task would never result in identifying a better video block match (in the case of FIG. 8) or where the additional computations for that task would be very unlikely to identify a better video block match (in the case of FIG. 9). FIG. 10 illustrates another termination technique that may be used independently or in conjunction with task termination techniques illustrated in FIGS. 8 and 9.

The technique of FIG. 10 is referred to as an iteration termination technique because it can be used to identify when an iteration can be terminated. For example, an iteration threshold can be established which determines when an identified previous video block is an acceptable match for effective encoding. In that case, the iteration may be terminated prematurely, and the identified video block that is an acceptable match to the current video block to be encoded can be used for the encoding. The technique illustrated in FIG. 10 may result in sub-optimal encoding because a subsequent task of the iteration (if performed) might actually identify a better match than the video block declared to be good enough. Still, the reduced number of computations and ongoing savings in power consumption may outweigh the fact that the encoding may be sub-optimal.

Referring again to FIG. 7, the encoding process may begin by defining encoding thresholds (71). For example, an iteration threshold may be defined by programming the iteration threshold into DSP 24. The encoding process then begins with the first block (N) to be encoded and performs a number of tasks per iteration, over a number of iterations as shown in FIG. 7. FIG. 10 illustrates the execution of one iteration in greater detail. Video encoder 20 compares a current block to previous block (N) (101), such as by invoking compare engine 56 of motion estimator 26 as outlined above. In some cases, the task of comparing the current block to a previous block (N) may be executed according to the principles of FIGS. 8 or 9, wherein a task threshold possibly causes early termination of the computations for the task.

Upon performing each individual task, video encoder 20 determines whether the difference value associated with the task is less than the iteration threshold (102). Again, compare engine 56 may include one or more local threshold registers 65 loaded with iteration threshold so that comparisons between calculated difference values and the iteration threshold can be made very quickly in hardware. In this case, threshold compare unit 66 can compare the iteration threshold stored in threshold registers 65 to difference values generated by difference unit 64 after each task. The difference values may be defined by different previous video blocks, e.g., macroblocks, stored in search space memory 62. In any case, video encoder 20 compares the difference value calculated for the given task to the iteration threshold. If the difference value of the task is less than the iteration threshold, i.e., if the difference value between the current block and block (N) is less than the iteration threshold, block (N) is declared acceptable and is used to encode the current block according to motion estimation techniques (105). In other words, the iteration is terminated early, avoiding subsequent tasks for that iteration, when an acceptable match is identified within the search space. As long as a task does not generate a difference value less than the iteration threshold, video encoder 20 iteratively performs the tasks for the iteration such as by comparing the current block to previous block (N) (101) and then incrementing the value of (N) (104) when more tasks are defined by the search space (yes branch of 103).

Upon performing all of the tasks for an iteration (no branch of 103), a best match may be identified for use in encoding the current block (105). However, in some cases, if after performing all of the tasks for an iteration (no branch of 103), motion estimation encoding techniques may be purposefully avoided because a video block having a difference value less than the threshold was not identified. In that case, the process of encoding the current video block (105) may involve only intraframe encoding techniques such as intraframe or spatial correlation techniques known in the art. In any case, the encoded block may be stored in memory 22 as subsequent iterations can be performed for the video frame being encoded.

The best match refers to the previous video block (or subsequent video block) stored within search space memory 62 that yields the lowest difference value when the difference computations are performed and summed by difference unit 64. When motion estimation techniques are used, this previous (or subsequent) video block that yields the best match to the current video block can be used to encode the current data block (105). In that case, the current video block can be encoded by storing the differences as well as a motion vector that identifies the previous video block used for the encoding.

If early termination of the iteration occurs (yes branch of 102), then the best match may not have been identified. Still, an adequate match was identified since iteration threshold was overcome. Thus, when an early termination of the iteration occurs in response to a task generating a difference value less than the iteration threshold, the previous video block associated with the task that caused early termination may be acceptable, i.e., "close enough." for effective video encoding. What constitutes a "close enough match" may depend on the iteration threshold, and may vary in different scenarios and different digital video devices. For example, in some cases, it may be more desirable to limit encoding computations at the expense of video resolution, and in other cases, it may be more desirable to find the best match even if a larger number of computations are required. In still other cases, the iteration threshold may be dynamically selected based on measurements of bandwidth or other video transmission parameters.

Figure 11:
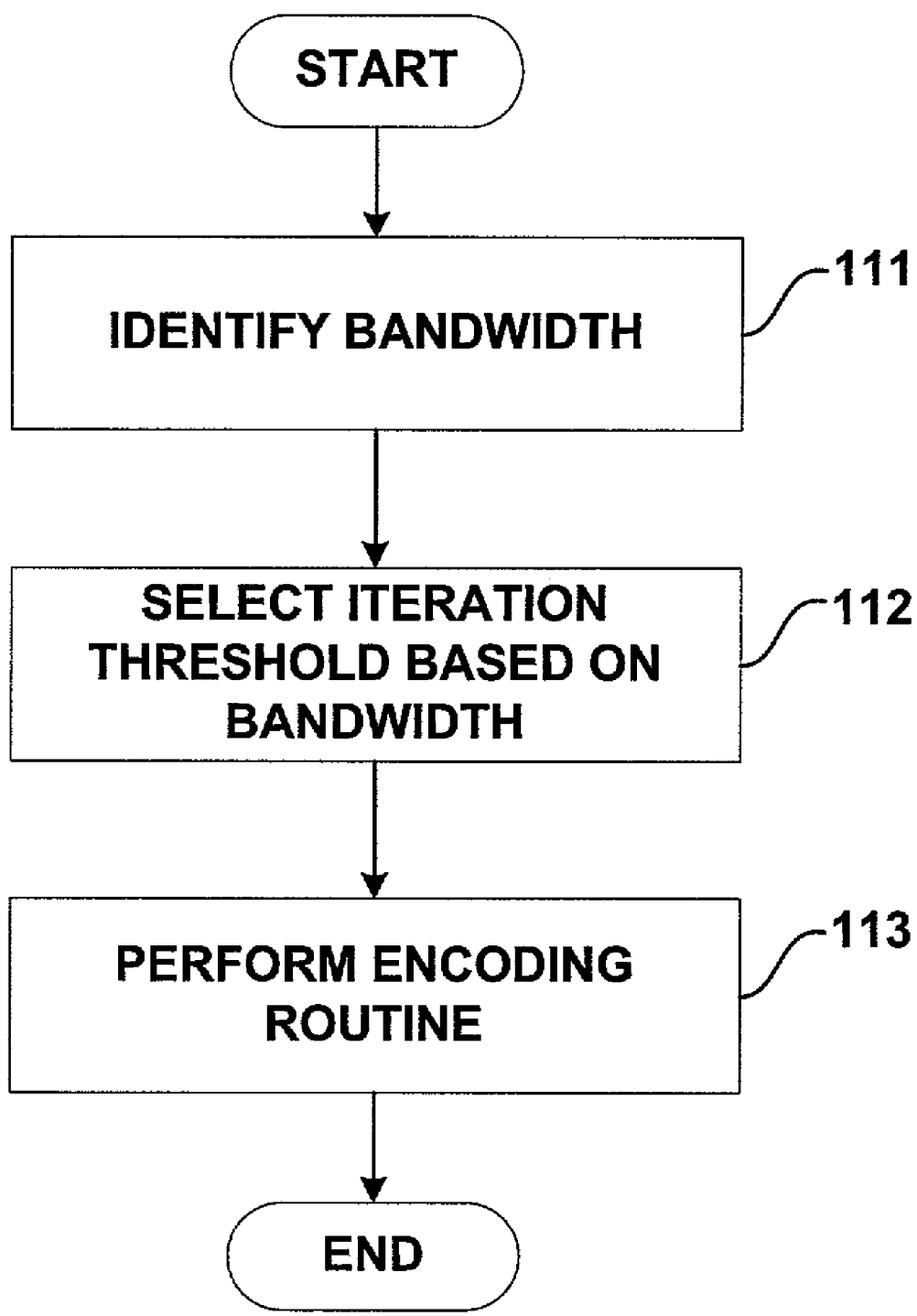

FIG. 11 is a flow diagram illustrating the dynamic selection of an iteration threshold as a function of an exemplary video transmission parameter. In this case, the transmission parameter is available bandwidth. As shown, digital video device 10 identifies the available bandwidth for video transmission (111), and selects the iteration threshold based on available bandwidth (112). Digital video device 10 then performs the encoding routine using the selected iteration threshold (113). In this manner, higher quality encoding can be achieved when available bandwidth allows for enough time to carry out all computations, and lower quality encoding can be used when bandwidth is a limiting factor.

Figure 12:
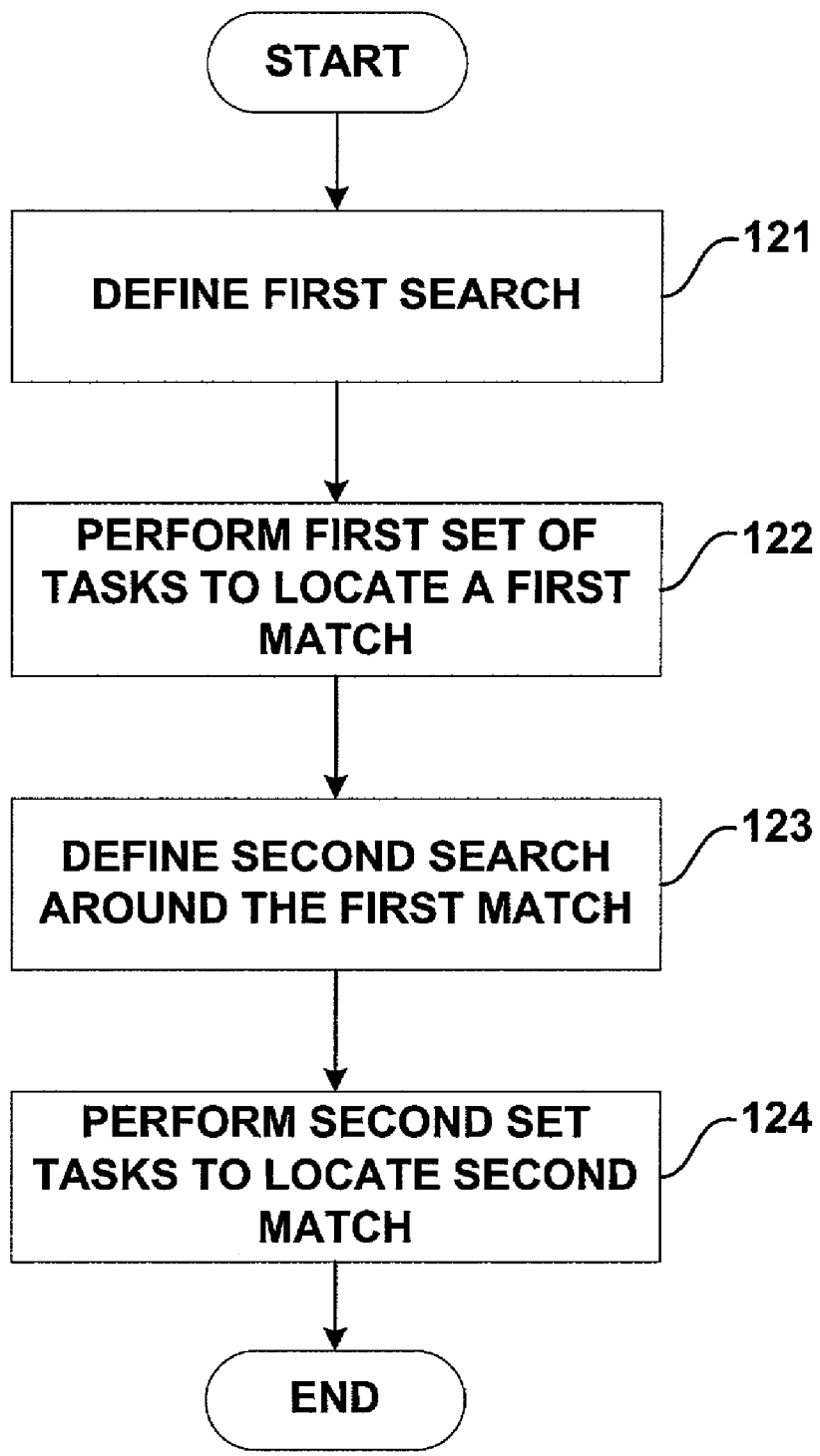

FIG. 12 is a flow diagram illustrating an additional technique that may be used to improve video encoding. In this case, an iteration includes multiple searches over a search space. The search space is defined by a previous video frame, a subset of a previous video frame, a subsequent video frame, or a subset of a subsequent video frame. As shown, digital video device 10 defines a first search on the search space (121), and performs a first set of tasks to locate a first match (122). Digital video device 10 then defines a second search based on the first match (123) and performs a second set of tasks to locate a second match (124). The second search may be performed on a subset of the search space, wherein the subset is defined by the image blocks of the search space located in close proximity to the first match. The second match may be a better match than the first match. The technique of FIG. 12 may be used to more quickly locate an acceptable match effective for video encoding.

For example, the first set of tasks may correspond to a coarse search performed over a search space. In particular, the coarse search may only compare the video block to be encoded to every $N^{th}$ video block of the search space. The second set of tasks may correspond to a fine search performed over a subset of the search space, wherein the subset is defined around the first match. Thus, the first search can be used to roughly locate an area of the search space that would likely include similar video blocks effective for video encoding, and the second search can be used to pinpoint a video block in the search space that is acceptable for effective video encoding. By way of example, the tasks performed during the first search may include comparing every $10^{th}$ video block of the search space to the video block to be encoded. During the second search, the tasks performed may include comparing all or some of the video blocks from the subset to the video block to be encoded. By way of example, the tasks performed during the second search may include comparing every $5^{th}$ video block in the subset of the search space to the video block to be encoded. Additionally, the technique may also include defining a third search based on the second match, and performing a third set of tasks to locate an image block search space that is a third match to the image block to be encoded, wherein the third match is a better match than the second match. Fourth, fifth, and sixth searches, and so forth, may also be performed.

The various termination techniques described herein, may be used in conjunction with the searching technique illustrated in FIG. 12. For example, during execution of the technique illustrated in FIG. 12, a task may be terminated when a difference value associated with the task exceeds a task threshold. Also, the technique illustrated in FIG. 12 may further include terminating performance of the first set of tasks upon identifying a matching image block in the first search that yields a difference value less than an iteration threshold. Furthermore, the technique may include terminating performance of the second set of tasks upon identifying a matching image block in the second search that yields a difference value less than another iteration threshold. In this manner, one or more of the termination techniques outlined above can be used in conjunction with the searching technique illustrated in FIG. 12.

A number of different embodiments have been described. The described techniques may be capable reducing the number of computations required for video encoding and may speed the encoding process. Furthermore, a reduced number of computations may result in reduced power consumption which is particularly advantageous for battery powered devices. The techniques may be useful with any of a wide variety of digital video encoding standards, including the MPEG-4 standard. As described, termination of computations may occur at a task level, an iteration level, or both. Moreover, in some cases, termination thresholds may be dynamically defined as a function of one or more transmission parameters such as bandwidth. Although many details have been described in the context of comparing a current video block to a previous video block of a previous video frame, it is understood that the same techniques may be used when the current video block is compared to subsequent video blocks of subsequent video frames. In other words, the techniques can be used in video encoding in which video blocks to be encoded are compared to video blocks of previous or subsequent image frames, or bi-directional motion estimation routines in which video blocks to be encoded are compared to video blocks of both previous and subsequent image frames.

The techniques may be implemented in hardware, software, firmware, or any combination thereof. If implemented in software, the techniques may be directed to a computer readable medium comprising program code, that when executed in a device that encodes video streams compliant with an MPEG-4 standard, performs one or more of the methods mentioned above. In that case, the computer readable medium may comprise random access memory (RAM) such as synchronous dynamic random access memory (SDRAM), read-only memory (ROM),non-volatile random access memory (NVRAM), electrically erasable programmable read-only memory (EEPROM), FLASH memory, and the like.

The program code may be stored on memory in the form of computer readable instructions. In that case, a processor such as DSP 24 may execute instructions stored in memory in order to carry out one or more of the techniques described herein. As outlined above, DSP 24 may invoke various hardware components of motion estimator 26 to accelerate the encoding process. These and other embodiments are within the scope of the following claims.

The invention claimed is:

1. A method comprising:
identifying bandwidth associated with a wireless device;
selecting a threshold for a video encoding routine based on the bandwidth;
executing the video encoding routine; and
terminating at least part of the video encoding routine when a calculated difference value overcomes the threshold.

2. The method of claim 1, wherein the threshold is a task threshold that establishes a threshold difference value, and wherein terminating at least part of the video encoding routine when a calculated difference value overcomes the threshold comprises terminating a task of estimating a difference between a current video block associated with a current video frame and a different video block associated with a different video frame when a difference value associated with the task becomes greater than the threshold.

3. The method of claim 2, wherein the different video block of the different video frame comprises a previous video block of a previous video frame.

4. The method of claim 2, wherein the different video block of the different video frame comprises a subsequent video block of a subsequent video frame.

5. The method of claim 1, wherein the threshold is an iteration threshold that defines an acceptable value, and wherein terminating at least part of the video encoding routine when a calculated difference value overcomes the threshold comprises terminating comparisons of a current video block associated with a current video frame with different video blocks associated with a different video frame upon identifying a different video block that defines a difference value less than then the threshold.

6. An apparatus that encodes video streams compliant with an MPEG-4 standard by:
identifying bandwidth associated with a wireless device;
selecting a threshold for a video encoding routine based on the bandwidth;
executing the video encoding routine; and
terminating at least part of the video encoding routine when a calculated difference value overcomes the threshold.

7. The apparatus of claim 6, wherein the threshold is a task threshold that establishes a threshold difference value, and wherein the apparatus terminates at least part of the video encoding routine when a calculated difference value overcomes the threshold by terminating a task of estimating a difference between a current video block associated with a current video frame and a different video block associated with a different video frame when a difference value associated with the task becomes greater than the threshold.

8. The apparatus of claim 6, wherein the threshold is an iteration threshold that defines a low-enough value, and wherein the apparatus terminates at least part of the video encoding routine when a calculated difference value overcomes the threshold by terminating comparisons of a current video block associated with a current video frame with different video blocks associated with a different video frame upon identifying a different video block that defines a difference value less than then the threshold.

9. The apparatus of claim 6, wherein the apparatus forms part of a device selected from the following group: a digital television, a wireless communication device, a personal digital assistant, a laptop computer, a desktop computer, a digital camera, a digital recording device, a cellular radiotelephone having video capabilities, and a satellite radiotelephone having video capabilities.

* * * * *